(12) United States Patent
Peterson et al.

(10) Patent No.: US 10,903,980 B2
(45) Date of Patent: Jan. 26, 2021

(54) SYSTEM AND METHOD TO PROTECT SENSITIVE INFORMATION VIA DISTRIBUTED TRUST

(71) Applicant: DATA REPUBLIC PTY LTD, Sydney (AU)

(72) Inventors: Ryan Matthew Peterson, Discovery Bay, CA (US); Julia Clavien, San Francisco, CA (US); Daniel James Gilligan, Erskineville (AU); Paul Milton McCarney, Clontarf (AU); Daniel Kevin Austin, West Pennant Hills (AU)

(73) Assignee: DATA REPUBLIC PTY LTD, Sydney (AU)

( * ) Notice: Subject to any disclaimer, the term of this patent is extended or adjusted under 35 U.S.C. 154(b) by 163 days.

(21) Appl. No.: 16/154,610

(22) Filed: Oct. 8, 2018

(65) Prior Publication Data

US 2019/0109706 A1    Apr. 11, 2019

Related U.S. Application Data

(60) Provisional application No. 62/569,660, filed on Oct. 9, 2017.

(51) Int. Cl.
*H04L 29/06* (2006.01)
*H04L 9/06* (2006.01)
(Continued)

(52) U.S. Cl.
CPC ........ *H04L 9/0637* (2013.01); *G06F 16/1805* (2019.01); *G06F 16/903* (2019.01);
(Continued)

(58) Field of Classification Search
CPC . G06F 16/2379; G06F 21/6218; H04W 12/06
(Continued)

(56) References Cited

U.S. PATENT DOCUMENTS

| 6,915,434 B1 | 7/2005 | Kuroda et al. |
| 2012/0023336 A1 | 1/2012 | Natarajan |

(Continued)

FOREIGN PATENT DOCUMENTS

| WO | 2017145010 | 8/2017 | |
| WO | WO-2017145010 A1 * | 8/2017 | ........... H04L 9/3066 |

OTHER PUBLICATIONS

International Search Report and Written Opinion, PCT/US2018/055008, dated Jan. 31, 2019.

*Primary Examiner* — Evans Desrosiers
(74) *Attorney, Agent, or Firm* — Greenberg Traurig

(57) ABSTRACT

Multiple, separately administrated computer systems storing slices of the cipher text of a Personally Identifiable Information (PII) data item that is represented by a token. The token is used as a substitute of the data item. The data item is encrypted using a public key. To recover the data item, a complete set of the slices is retrieved from the separate computer systems and decrypted using the private key corresponding to the public key. Instances and circumstances of the usages of the data item can be recorded under the token in a blockchain ledger in connection with the retrieval and/or decryption of the cipher text. A data item owner may use the data item and the public key to recreate the cipher text, retrieve the token stored with the cipher text in the separate computer systems, and then query the ledger for a usage history of the data item.

18 Claims, 5 Drawing Sheets

(51) Int. Cl.
*H04L 9/08* (2006.01)
*G06F 21/62* (2013.01)
*H04L 9/32* (2006.01)
*G06F 16/903* (2019.01)
*G06F 16/18* (2019.01)

(52) U.S. Cl.
CPC ...... *G06F 21/6209* (2013.01); *G06F 21/6245* (2013.01); *H04L 9/0825* (2013.01); *H04L 9/3213* (2013.01)

(58) Field of Classification Search
USPC .......................................................... 713/189
See application file for complete search history.

(56) References Cited

U.S. PATENT DOCUMENTS

2017/0177855 A1* 6/2017 Costa Faidella ........ G06F 21/45
2018/0367298 A1   12/2018 Wright et al.

\* cited by examiner

SYSTEM AND METHOD TO PROTECT SENSITIVE INFORMATION VIA DISTRIBUTED TRUST

RELATED APPLICATIONS

The present application claims the benefit of the filing date of Prov. U.S. Pat. App. 62/569,660, filed Oct. 9, 2017 and entitled "System and Method to Protect Sensitive Information via Distributed Trust", the entire disclosure of which is hereby incorporated herein by reference.

The present application is related to U.S. patent application Ser. No. 15/078,804, filed Mar. 23, 2016 and entitled "Systems and Methods to Protect Sensitive Information in Data Exchange and Aggregation", and U.S. patent application Ser. No. 15/685,305, filed Aug. 24, 2017 and entitled "Systems and Methods to Control Data Access and Usage", the entire disclosures of which applications are hereby incorporated herein by reference.

FIELD OF THE TECHNOLOGY

At least some embodiments disclosed herein relate to data storage and retrieval in general and more particularly but not limited to protection of identity information in data storage and retrieval.

BACKGROUND

Personally Identifiable Information (PII) is data that could potentially identify a specific individual. Information that can be used to distinguish one person from another and can be used for de-anonymizing anonymous data may be considered PII. PII can be used on its own or with other information to identify, contact, or locate a single person, or to identify an individual in context. From PII the identity of a corresponding person can be reasonably ascertainable.

Examples of PII include full name, home address, email address, national identification number, passport number, driver's license number, telephone number, credit card numbers, digital identity, IP address, login name, screen name, nickname, date of birth, birthplace, genetic information, facial image, fingerprints, or handwriting.

There is a need to protect PII for privacy, anonymity, and/or compliance with rules, laws and regulations.

U.S. Pat. No. 7,933,841 discloses a system to track member consumer credit card transactions without receiving personal information for non-members by using a one way hash function. In such a system, a one-way hash function is applied to personal information (e.g., a credit card number) to obtain fingerprints that represent the personal information. The personal information in transaction data of credit card users is replaced by the fingerprints, where some of the users are members and some of the users are non-members. A computer having the personal information of the members can used the personal information to generate the corresponding fingerprints to identify the transactions of the members without access to the personal information of the non-members. The one way hash function makes it nearly impossible to reverse the fingerprints to the corresponding personal information that the computer does not already have.

Storing PII includes various risks of data breach. For example, a rouge agent, such as a database administrator or a data analyst, may take the personal information offsite. A hacker or group of hackers may gain administrative access to the database infrastructure and thus the PII stored therein. A person or two may collude to break the law and cause data breach. Trojan horses, and other infiltrating attacks have been successful in causing data breach in not only PII but also associated attributes.

Customers generally want a level of control over their information. Governments want to ensure the identity information of their constituents are safe.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
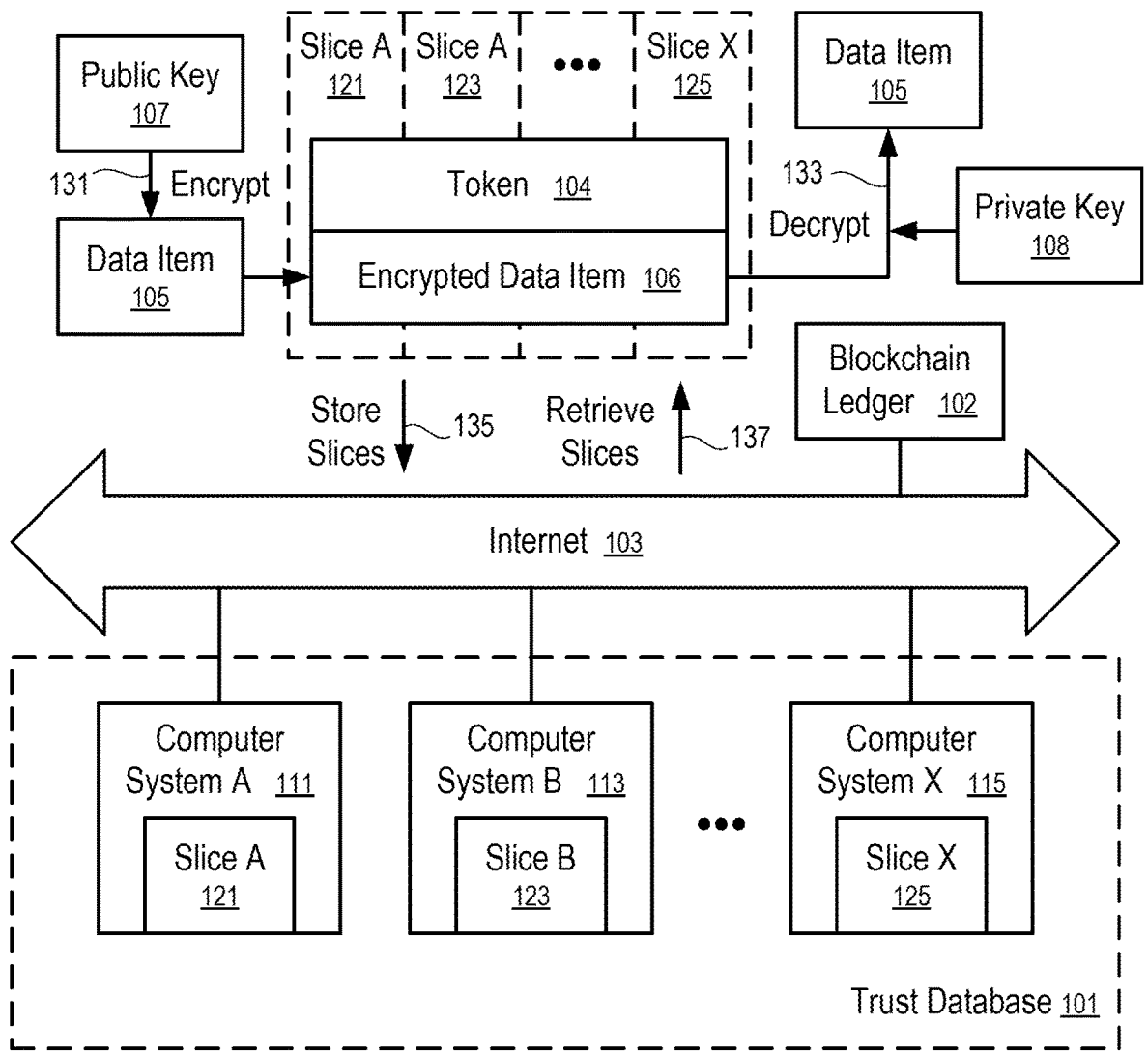
FIG. 1 shows a system to protect data items according to one embodiment.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Storing personal information of users within an organization carries the risk of massive data breach and that risk is getting greater with every day.

To reduce and/or eliminate the risk, techniques disclosed herein store a piece of personal information as an encrypted data item that is sliced into multiple portions for storage on multiple, separately administrated computer systems of different organizations.

As a result, decrypting the encrypted data item requires the assembly of the sliced portions that are separately stored in the separate systems. Thus, the risk of a massive data leak is significantly reduced; and breaching one or more of the computer systems is insufficient to yield useful information. Therefore, the trust of data security is distributed to a set of computer systems that are separately secured, administrated, and maintained.

An asymmetrical encryption method can be used to generate the encrypted data item using a public key of a pair of private and public keys, where the decryption of the encrypted data item requires the use of the private key. It is impractical to derive the private key from the public key; and the public key cannot be used to decrypt the cipher text generated using the public key. Thus, access control of the private key further improves data security.

To establish data connections with the protected data items stored in the system, a token is used to uniquely represent a data item among the data items stored in the system. The token is used in place of the data item in establishing the data connections. When the use of the data item itself is required, the token can be used by an authorized system to retrieve the corresponding data item.

It may be desirable to record the use instances of a data item itself represented by a token, such that the use instances may be audited. When the data item is decrypted for an instance of data use, the instance can be recorded for the token in a blockchain ledger, in a way similar to the recordation of a transaction of cryptocurrency. Thus, the blockchain ledger has the usage history of the token of the data item, which can be retrieved for inspection. For example, an owner of the data item may use the public key to generate the cipher text of the data item to look up the token that is associated with the cipher text and then look up the usage history recorded for the token in the blockchain ledger.

In addition to recording the use instances of a data item, the system can be further extended to record an intended use (e.g., proposed by a data analyst for the use of the data) and/or a permitted use (e.g., authorized by the consumer or original data custodian for the user of the data). Thus, an approval system can automate data use approval by matching an intended use against a permitted use formulated using an ontology or standardized nomenclature for specific data tokens. Such a usage can be recorded in a blockchain or distributed ledger for later auditing as described above.

FIG. 1 shows a system to protect data items according to one embodiment.

In FIG. 1, a data item (105) is encrypted using an asymmetrical encryption method that involves a pair of a public key (107) and a private key (108), which are generated together in a key generation process. The public key (107) can be applied to the data item (105) to generate the encrypted data item (106) in the phase of encryption (131); and the private key (108) can be applied to the encrypted data item (106) to recover the data item (105) in the phase of decryption (133).

Since it is not practical to derive the private key (108) from the public key (107), it is not necessary to restrict access to the public key (107). Thus, the public key (107) can be published to enable the encryption (131) at a variety of computing devices, such as a user computer, a centralized server that provides the service, a purported recipient of the data item (105), etc.

To prevent unauthorized access, the private key (108) is not published and resides in a computer system that is authorized to perform the decryption (133).

In FIG. 1, the data item (105) and the encrypted data item (106) are represented by a unique token (104). The token (104) uniquely identifies the data item (105) and/or the encrypted data item (106) among data items stored in the system.

For example, the data item (105) may contain a piece of PII, such as a government issued identification number of a person, an address, a payment account identifier, etc.

The token (104) may be generated based at least in part on the data item (105) and/or the encrypted data item (106) in some implementations. For example, a cryptographic, one-way hash of the data item (105) and/or the encrypted data item (106) may be used in generating the token (104).

In other implementations, the token (104) is generated independent of the data item (106). For example, a random number may be used for the token (104).

In some instances, the uniqueness of the token (104) is verified prior to its use as an identifier of the encrypted data item (106). For example, the system may check that the token (104) has not been used to represent an existing date item stored in the system.

In some instances, the data item may be processed in a cleansing and standardization operation to reduce duplicates. Items having the same content may be assigned the same token. For example, the encrypted data item (106) may be used as a key to search for a token (104) that is already stored in the system in association with the encrypted data item (106).

The token (104) may be used as a substitute of the data item (105) in applications where the actual content of the data item (105) is not used. For example, a social networking account may be registered to a person that is identified using the data item (105). Instead of storing the data explicitly connecting the social networking account with the data item (105) of the person, the social networking account is stored in association with the token (104). Thus, if the database of the social networking site identifying the association between accounts and the tokens representing the identities of their users is stolen, the identities of the account users are still protected.

In FIG. 1, the token (104) and the encrypted data item (106) form a data record that is divided into multiple slices (121, 123, ..., 125), which are stored in a set of separately managed computer systems (111, 113, ..., 115).

For example, some of the computer systems (111, 113, ..., 115) are operated by government entities; some of the some of the computer systems (111, 113, ..., 115) are operated by banks; some of the some of the computer systems (111, 113, ..., 115) are operated by non-profit organizations; some of the computer systems (111, 113, ..., 115) are operated by technology companies; some of the computer systems (111, 113, ..., 115) are operated by credit bureau; etc.

The computer systems (111, 113, ..., 115) of different organizations and entities are combined on a computer network (e.g., Internet (103)) to form a virtual distributed trust database (101) that stores (135) the slices (121, 123, ..., 125) of a data record.

Some of the participants of the computer systems (111, 113, ..., 115) may have a need to secure PII to provide their services, while others may have an interest in protecting PII of computer users in general. Through their contributions in the trust database (101), their risk of massive PII data breach is significantly reduced, since each of the organizations is in possession only a slice of data for the recovery of the data item (105). Thus, gaining administrative privilege through hacking or rouge agents in one or more of the computer systems (111, 113, ..., 115) is insufficient to cause massive leak of useful information, such as PII.

In FIG. 1, any subset of the computer systems (111, 113, ..., 115) does not have the complete token (104) and does not have the complete encrypted data item (106). To obtain the complete token (104) and/or the complete encrypted data item (106), it is necessary to have access to all of the computer systems (111, 113, ..., 115) that are separately secured, managed, maintained, and administrated.

In FIG. 1, when only a subset of the slices (121, 123, ..., 125) is available, the data item (105) cannot be decrypted even with the private key (108).

To retrieve (137) the complete set of slices (121, 123, ..., 125), a computer system is required to have authorized access to the entire set of computer systems (111, 113, ..., 115).

In some implementations, data redundancy is built into the generation of the slices such that when more than a threshold number of slices are retrieved from a subset of the computer systems (111, 113, ..., 115), the complete copy of the data record containing the token (104) and the encrypted data item (106) can be recovered and assembled. Such a trust database (101) has improved reliability, such as when some of the systems (111, 113, ..., 115) is temporarily unavailable for various reasons. Increasing the threshold number increases the data security of the trust database (101).

In FIG. 1, a blockchain ledger (102) is used to record the usages of the data item (105) represented by the token (104).

For example, when a data record containing the token (104) and the encrypted data item (106) is retrieved (137) from the trust database (101) for a particular use, the instance of the use is recorded in the blockchain ledger (102) for the token (104). The use record stored in the blockchain ledger (102) may include the identification of the token (104), a recipient of the data record for the recorded instance of the use, and/or a description of the use, etc.

In some instances, a predetermined method is used to divide the data record of the token (104) and the encrypted data item (106) into the slices (121, 123, ..., 125). Thus, it is not necessary to record data for the retrieval (137) of the slices (121, 123, ..., 125) for reconstruction of the data record.

Alternatively, or in combination, the creation of the slices (121, 123, ..., 125) for storage in the trust database (101) is also recorded in the blockchain ledger (102) to facilitate the retrieval (137) of the slices (121, 123, ..., 125) and reconstruction of the data record from the slides (121, 123, ..., 125).

In one implementation, a centralized computer platform is provided to perform the storing (135) and retrieving (137) operations. The platform controls the private key (108) to the decryption (138) and records the creation and uses of the data record in the blockchain ledger (102). However, the platform does not store persistently the data record containing the token (104) and the encrypted data item (106). After each session of the storing (135) and retrieving (137) operations, the data record is purged from the platform.

In some implementations, the centralized computer platform is not responsible for the decryption (138). A computer system that is authorized to use the data item (105) controls the private key (108). For example, if the data item (105) is initially submitted to a social networking site for the registration of a social networking account, the public key (107) of the social networking site is used for the encryption (131); and the private key (108) of the social networking site is required for the decryption (133).

Alternatively, or in combination, the storing (135) operation can be performed by other computing devices. For example, when a web browser of a user computer communicates with a social networking site to register an account, the web browser may obtain the public key (107) of the centralized computer platform (or the social networking site) to generate the encrypted data item (106), obtain the token (104), store (135) the slices (121, 123, ..., 125) in the trust database (101), and provide the token (104) to the social networking site. Alternatively, the web browser communicates the data item to the centralized computer platform (or the social networking site), which encrypts (131) the data item, and stores (135) the slices (121, 123, ..., 125).

In some instances, permitted uses of the data item is stored to control the access to the data record containing the token (104) and the encrypted data item (106). For example, the permitted use may be stored in the blockchain ledger (102) or a database of a computing system in possession of the private key (108) such that the decryption (133) is performed only for permitted uses.

In one implementation, a computer platform is configured to facilitate the retrieval (137) to the data record containing the token (104) and the encrypted data item (106). The platform can be implemented using a computer system separate from the computer systems (111, 113, ..., 115) in the trust database (101), or as a collaboration function of the computer systems (111, 113, ..., 115) in the trust database (101).

For example, in response to a request to retrieve (137) a data record that contains the token (104), the computer platform determines the portions of the token (104) in the slices (121, 123, ..., 125), requests the respective computer systems (111, 113, ..., 115) to retrieve the slices (121, 123, ..., 125) that contain the respective portions of the token (104) and reassemble the slices (121, 123, ..., 125) into the data record.

Similarly, a request to retrieve (137) a data record can be made using the encrypted data item (106) as the key. For example, a computer system in possession of the data item (105) may use the public key (107) to generate the encrypted data item (106) to request the trust database (101) to provide the token (104) stored with the encrypted data item in the data record.

In some instances, the portion of the token (104) (or the encrypted data item (106)) in a slice (e.g., 121) stored in a computer system (e.g., 111) in the trust database (101) is not unique among slices stored for different data records. Thus, a query made using a token slice (or a slice of the encrypted data item (106)) may generate query results from different data records. To identify a correct set of slices for the reconstruction of a data record, the trust database (101) may store further data that can be used to identify a match of a set of slices that belong to the same data record. For example, the slice (121) can be stored with a hash of the combination of the other slices (123, ..., 125) such that a correct set of slices can be selected for the reconstruction of a requested data record. In some instances, a serial number of the data record is used to assemble the slices. Some implementations, the token (104) is not sliced; and each slice (121, 123, ..., 125) includes a complete copy of the token (104), which can be correlated across slices (121, 123, ..., 125) to reconstruct the encrypted data item (106).

The blockchain ledger (102) can be implemented in a network of user computers, such as the user computers from which the data items (e.g., 105) containing PII are initially submitted, or user computers that are registered to participate in the protection of PII via the trust database (101). Alternatively, or in combination, the activity records of the tokens (e.g., 104) can be stored in a centralized database, in at least some of the computer systems (111, 113, ..., 115), or in the trust database (101) in a way similar to the storing of the data record containing the token (104) and the encrypted data item (106).

In some implementations, one or more permitted use cases of the data item (105) are specified in accordance with an ontology or standardized nomenclature. The permitted use cases can be encoded within or with the data token (104). A request to access the data token (104) can include an intended use case specified in accordance with the same ontology or standardized nomenclature. Thus, the approval of the intended use case identified for the request to access the data token (104) can be automated via matching the intended use case against the one or more permitted use cases. For example, when an intended use case meets the requirements of any of the permitted use cases, the intended use case can be approved automatically via an automated approval system. In some instances, the automated approval system determines whether an intended use case can be approved based on a determination whether the one or more permitted use cases encoded within or with the data token (104) contain the intended use case.

Figure 2:
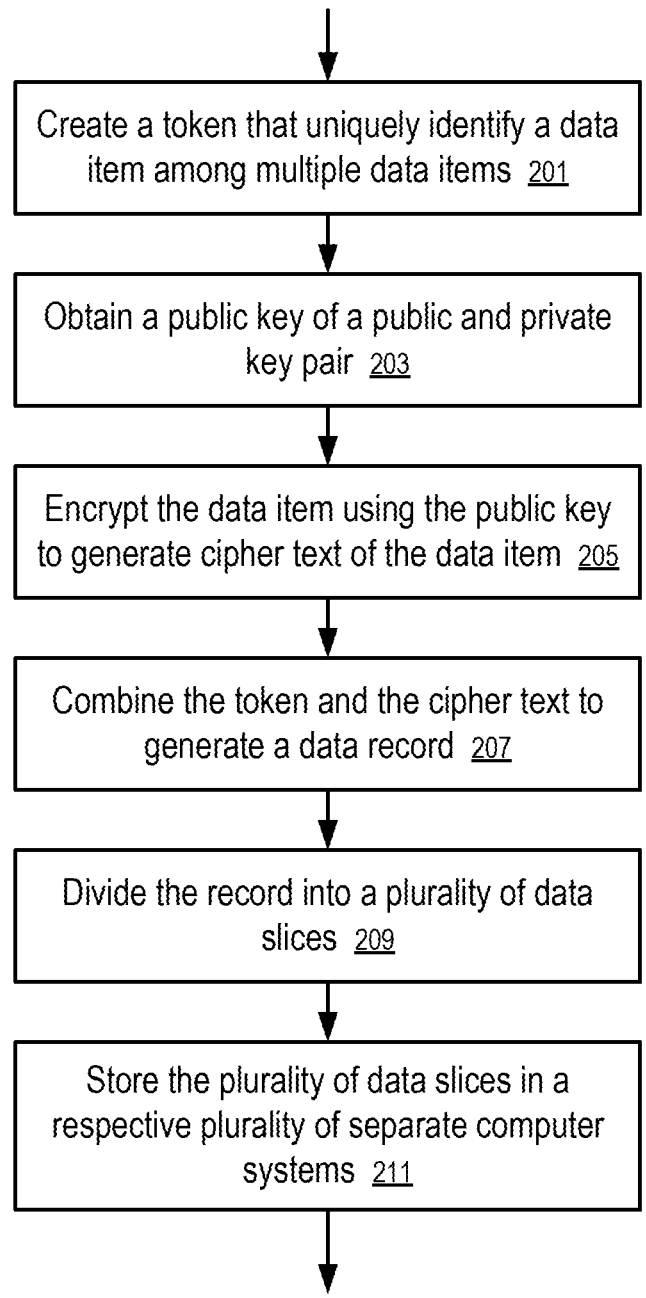
FIG. 2 shows a method to store a data item according to one embodiment.

FIG. 2 shows a method to store a data item according to one embodiment. For example, the method of FIG. 2 can be implemented in the system of FIG. 1.

The method of FIG. 2 includes: creating (201) a token (104) that uniquely identify a data item (105) among multiple data items; obtaining (203) a public key (107) of a public and private key pair; encrypting (205) the data item (105) using the public key (107) to generate cipher text (106) of the data item (105); combining (207) the token (104) and the cipher text (106) to generate a data record; dividing (209) the data record into a plurality of data slices (121, 123, . . . , 125); and storing (211) the plurality of data slices (121, 123, . . . , 125) in a respective plurality of separate computer systems (111, 123, . . . , 125).

Figure 3:
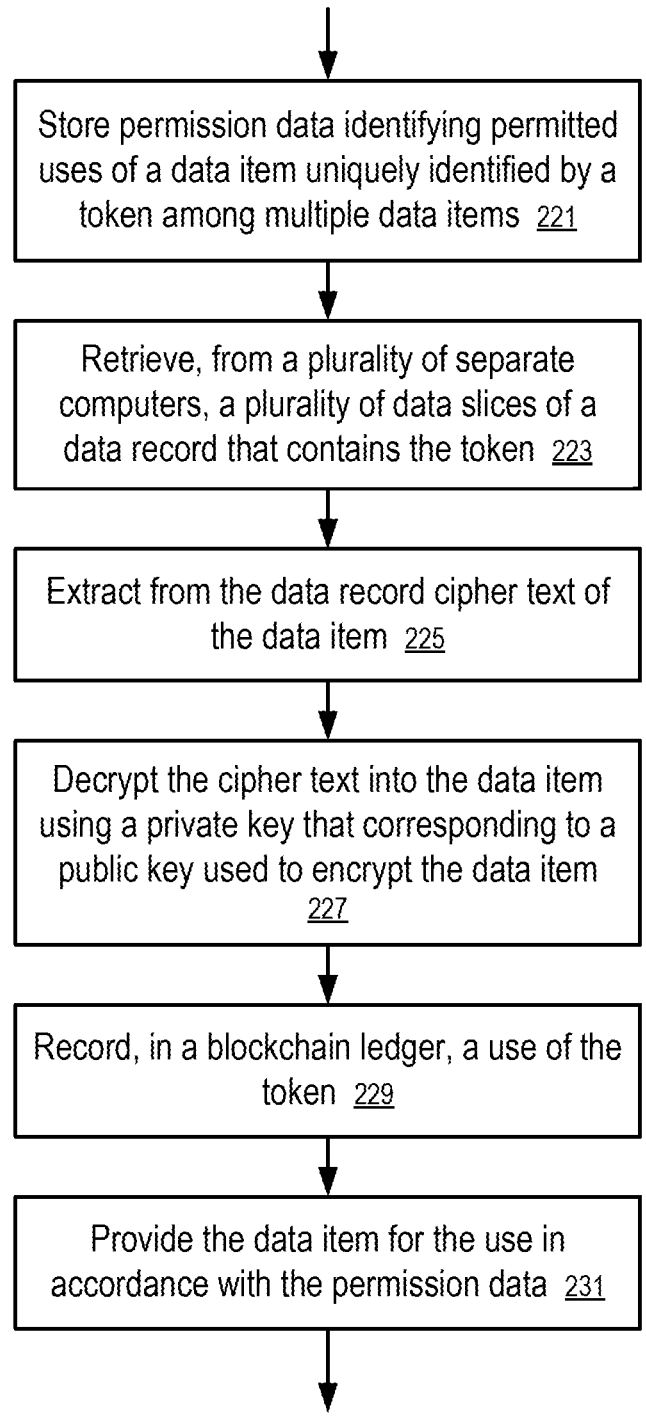
FIG. 3 shows a method to retrieve a data item according to one embodiment.

FIG. 3 shows a method to retrieve a data item according to one embodiment. For example, the method of FIG. 3 can be implemented in the system of FIG. 1.

The method of FIG. 3 includes: storing (221) permission data identifying permitted uses of a data item (105) uniquely identified by a token (104) among multiple data items; retrieving (223), from a plurality of separate computers (111, 113, . . . , 115), a plurality of data slices (121, 123, . . . , 125) of a data record that contains the token (104); extracting (225) from the data record cipher text (106) of the data item (105); decrypting (227) the cipher text (106) into the data item (105) using a private key (108) that corresponds to a public key (107) used to encrypt (131) the data item (105) into the cipher text (106); recording (229), in a blockchain ledger (102), a use of the token (104); and providing (231) the data item (105) for the use in accordance with the permission data.

In some instances, the retrieving (223) of the data record from the set of separate computers (111, 113, . . . , 115) is in accordance with the permission data.

In some instances, the extracting (225) of the cipher text from the data record is in accordance with the permission data.

In some instances, the decrypting (227) of the cipher text into the data item (105) is in accordance with the permission data.

For example, the governance of the data usage can be implemented using a system discussed in U.S. patent application Ser. No. 15/685,305, filed Aug. 23, 2017 and entitled "Systems and Methods to Control Data Access and Usage", the entire disclosure of which is hereby incorporated herein by reference.

Figure 4:
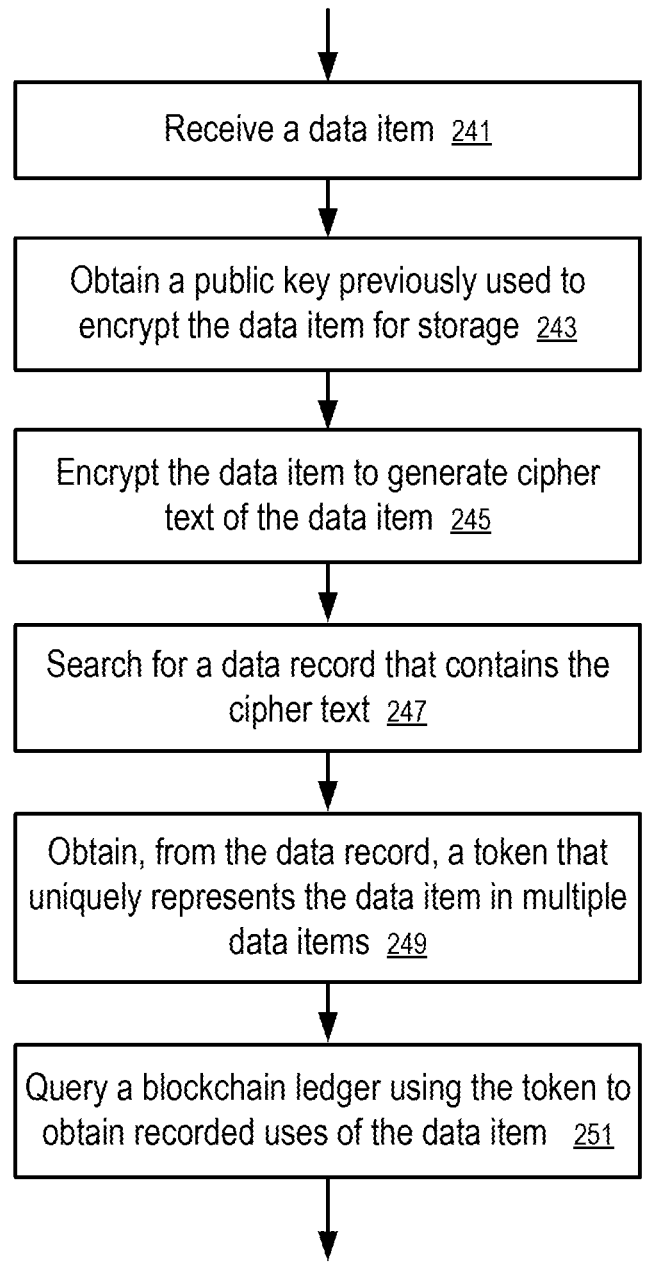
FIG. 4 shows a method to obtain a history of uses of a data item according to one embodiment.

FIG. 4 shows a method to obtain a history of uses of a data item according to one embodiment. For example, the method of FIG. 4 can be implemented in the system of FIG. 1.

The method of FIG. 4 includes: receiving (241) a data item (105); obtaining (243) a public key (107) previously used to encrypt (131) the data item (105) for storage; encrypting (245) the data item (105) to generate cipher text (106) of the data item (105); searching (247) (e.g., in a trust database (101)) for a data record that contains the cipher text (106); obtaining (249), from the data record, a token (104) that uniquely represents the data item (105) in multiple data items; and querying (251) a blockchain ledger (102) using the token (104) to obtain recorded uses of the data item (105).

For example, the data item (105) may be a piece of PII of the user. The user may want to see the usage history of the PII by various computer systems. Thus, the user may use a web browser to visit a portal or run an application to retrieve the activity records stored in the blockchain ledger (102) for the PII. The portal or the application regenerates the encrypted data item (106) to query the trust database (101) for the token (104) that represents in the data item (105). With the token (104), the portal or the application extracts the activity records of the token (104) and presents the activity history to the user.

At least one embodiment disclosed herein includes a distributed trust system and method that protects the PII of a user. For example, John Doe goes to www.company.com to register for an account. He enters his name, address, phone number, and/or other PII. He subsequently is provided a service from the company to which he has signed up. When John hits submit on the registration screen, any fields marked as PII (which may include even his password) are sent to a system that stores only temporarily the PII in memory and encrypts the PII, if it is not already encrypted at the web interface layer by the browser of John or the web server of the system. For example, the email address john@doe.com of John is now a cipher text in the form of a text string similar to ABCDEF123456. The cipher text is not a hash and can be decrypted as required. All of the data fields containing PII can be processed in a similar way; and the encrypted data can be sliced into portions for spreading their storage across tens or hundreds of partner nodes of a trust database. The process can be used for web interfaces, SaaS applications (using APIs), databases, and anything else that stores PII today.

A de-identifier can be used to encrypt a data item. Encryption has to be at least as long as the original text. A long email address will therefore take more nodes to ensure it is sliced appropriately. For example, john@doe.com has 12 characters and can become a cipher text in the form of A1B2C3D4E5F6 which can be decrypted to recover the data john@doe.com.

In some implementations, a data item is padded up to at least a predetermined length to facilitate proper slicing such that each slice has a length longer than a threshold.

In one implementation, a platform (e.g., Personal Information Governor) is configured to create a natural key for a piece of PII that is to be protected. In alternative implementations, the natural key might change rapidly (e.g., quantum keys). These keys are then used in places of the respective pieces of PII in databases where the person has associated non-PII data, thus anonymizing the data.

The platform (e.g., Personal Information Governor) slices the encrypted PII data into equal parts and distributes the parts to multiple third-parties via the internet along with the key created. For example, key1, ABCD may be sent to a bank where that portion of the slice is then stored, key1, EF12 may go to a government agency, and key1, 3456 may go to a telecommunications company, by way of example.

Optionally, some portions of data normally defined as PII may not be represented by tokens so long as it no longer identifies a single person. For example, a postal code may normally be categorized as PII when used with an address, but if the address if removed from a computer system of a company or government agency, then the postal code may be retained in the computer system. In another example, the first initial of a last name could in theory be allowed as well for purposes of sorting basic admin work often done with things like sorting customers, etc.

After the encrypted PII has been sliced and sent to multiple different entities, a company or government agency has no data in any database that can identify a person. The data that can identify someone has been distributed to a network of other organizations, each with only a small part of the encrypted data, which cannot be decrypted without both the keys as well as the entire string of the encrypted data. Such an arrangement effectively removes the ability for a rouge agent within an organization to steal PII data as it can no longer be associated to a specific person.

For example, Mary Jane, a digital marketing specialist needs to send an email blast to a section of customers telling them about the latest promotion. She has identified a list of customers she would like to send to and has filtered to identify the keys or tokens of a list of the selected customers. She now enters a web interface on the platform (e.g., Personal Information Governor) and requests to use the email addresses of these users for the permitted use of emailing them a promotion. Her company identification, company name, permitted use, time stamp, list of keys, the opt-in collection mark, and other fields are submitted and an administrator of the platform approves the access. Thus, the keys or tokens are used to retrieve and decrypt the email addresses from the trust database. Usage rules can be set based on the breadth and sensitivity of the data or use case and additional approvers may be required (such as the Chief Reputation Officer (CRO) the Chief Executive Officer (CEO), or the Chief Operating Officer (COO)).

The complete setup data for the use case of Mary is then sent along with the keys/tokens to the partner organizations, which will then provide the platform (e.g., Personal Information Governor) with the encrypted elements. The platform temporally puts the pieces back together, decrypts the data, and provides it to Mary for her campaign. Alternatively, this may be done by manipulating the email platform to receive the tokens from Mary and the email platform will request and subsequently receive the email addresses to resolve. In one embodiment, the same process can be done for physical mail, data analysis, and the many other use cases required of PII within an organization.

When the partner organizations receive the requests for PII encryption slices, they may write the request details into a blockchain or equivalent immutable record. These records will then make up a way to immutably audit the use of an identity within an organization and ensure compliance and ethics are being followed.

Optionally, customer facing interfaces is provided to allow customers to see all uses of their identity and secondarily opt-out of a particular use case. For example, if a person was submitted to the system for an email campaign, but the option flag was off, that person can also see that they did not get the promotion because their flag was off and secondarily opt-in. In an alternative embodiment, the system could be monetized by the consumer (e.g., I'll sell you use of my PII or provide in exchange for loyalty points, etc.)

Optionally, when a customer returns to the website and types their email address and password, the data traverses in real time through the encryption and data slicer, finds a match, and the corresponding key is used to handle the remainder of their session. Optionally, a key can be associated to a cookie so it doesn't need to be looked up during every login.

In one example, when an organization wishes to relocate PII to the trust database (101), the organization creates a public and private key pair using public key cryptography. The public key is made available to the public to allow PII to be stored as slices of encrypted PII across multiple computer system (111, 113, . . . , 115).

When the organization has an data item (105) including PII, such as a social security number (SSN), the organization stores the data item (105) in the trust database (101) and uses a token in its private database as a substitute of the data item.

For example, the organization obtains or generates a token that corresponds one-to-one with the data item (105) that identifies an individual person. the data item (105) is encrypted using the public key (107) to generate the cipher text (106). The cipher text (106) and the token (104) are stored together in the trust database (101) as slices (121, 123, . . . , 125) that are distributed among the separate computer systems (111, 113, . . . , 115).

When the organization that previously stored a data item (105) containing PII into the trust database (101) now wants to retrieve the PII, the organization determines the token (104) that corresponds to the data item (105) containing the PII of the individual person. The trust database (101) is queried using the token (104) to obtain the cipher text (106) of the data item (105). The organization uses its private key (108) to decrypt the cipher text (106) and obtain the data item (105) containing the PII.

An individual person wishes to view the ledger transactions that correspond to themselves and that are created by the organization. The individual person obtains the public key (107) published by the organization and encrypts the data item (105) containing the PII using the public key (107) to generate the cipher text (106). The trust database (101) is queried using the cipher text (106) to obtain the token(s) (e.g., 104). The ledger (102) is queried using the token (104) to retrieve the transaction records of the token (104).

In one implementation of consumer auditing, anyone can obtain the public key to encrypt his/her data item (105) to generate the cipher text (106) to query the trust database (101) for his/her token (104), which can then be used to query the ledger (102). Preferably, if someone does not have a particular data item (105) in plaintext (e.g., SSN), this person cannot generate a correct cipher text (106) and thus cannot get his/her token (104) and thus cannot query the ledger (102). However, if the plaintext space is small (e.g., the total number of all possible variations of plaintext is small), an attacker can do a "hash reversal" attack by computing a dictionary of cipher text for all possible variations of plaintext. Then, the attacker has all of the valid cipher text values to look up all of the tokens (104) for querying the ledger (102). Preferably, an identity verification process is used to verify that the query is from the consumer identified by the PII. For example, the consumer may be validated via information that is not likely to be known to others, such as the current car payment amount, etc.

Figure 5:
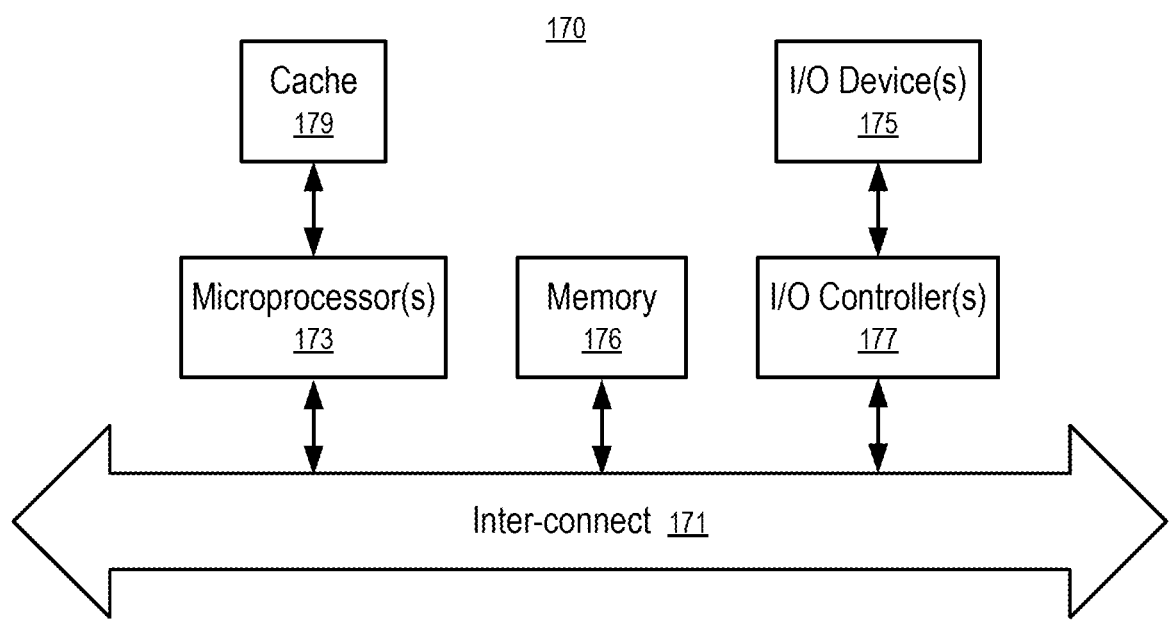
FIG. 5 shows a data processing system that can be used to implement some of the components of the system according to one embodiment.

FIG. 5 shows a data processing system that can be used to implement some of the components of the system according to one embodiment. While FIG. 5 illustrates various components of a computer system, it is not intended to limit the implementations to any particular architecture or manner of interconnecting the components. One embodiment may use other systems that have fewer or more components than those shown in FIG. 5.

For example, each of the computer systems (111, 113, . . . , 115) illustrated in FIG. 1 can be implemented using one or more data processing systems illustrated in FIG. 5, with fewer or more components than those shown in FIG. 5.

For example, the blockchain ledger (102) illustrated in FIG. 1 can be implemented in a network of computers, each of which is implemented using one or more processing systems illustrated in FIG. 5, with fewer or more components than those shown in FIG. 5.

For example, a computer platform (e.g., Personal Information Governor), or a user computer, can be implemented using one or more data processing systems illustrated in FIG. 5, with fewer or more components than those shown in FIG. 5.

In FIG. 5, the data processing system (170) includes an inter-connect (171) (e.g., bus and system core logic), which interconnects a microprocessor(s) (173) and memory (176). The microprocessor (173) is coupled to cache memory (179) in the example of FIG. 5.

In one embodiment, the inter-connect (171) interconnects the microprocessor(s) (173) and the memory (176) together and also interconnects them to input/output (I/O) device(s) (175) via I/O controller(s) (177). I/O devices (175) may include a display device and/or peripheral devices, such as mice, keyboards, modems, network interfaces, printers, scanners, video cameras and other devices known in the art. In one embodiment, when the data processing system is a server system, some of the I/O devices (175), such as printers, scanners, mice, and/or keyboards, are optional.

In one embodiment, the inter-connect (171) includes one or more buses connected to one another through various bridges, controllers and/or adapters. In one embodiment the I/O controllers (177) include a USB (Universal Serial Bus) adapter for controlling USB peripherals, and/or an IEEE-1394 bus adapter for controlling IEEE-1394 peripherals.

In one embodiment, the memory (176) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

The disclosures of the above discussed patent documents are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method to secure data from unauthorized access, the method comprising:
   receiving a public key of a computer system authorized to use a data item;
   providing a token representing the data item to the computer system as a substitute of the data item;
   encrypting the data item using the public key into a cipher text that is to be decrypted using a private key of the computer system;
   dividing the cipher text into multiple portions; and
   communicating the multiple portions to respective multiple computer systems that are separately administrated by different organizations, wherein each respective system of the multiple computer systems stores, in connection with the token, no more than a portion of the cipher text, which portion is not decryptable using the private key without a remaining portion of the cipher text that is not stored in the respective system;
   wherein the computer system authorized to use the data item does not store persistently the data item;
   wherein in response to a request to use the data item, the computer system retrieves the cipher text from the multiple computer systems using the token and decrypts the cipher text into the data item.

2. The method of claim 1, further comprising:
   receiving the token; and
   communicating with the multiple computer systems to retrieve the cipher text.

3. The method of claim 2, further comprising:
   storing permission data identifying permitted uses of the data item represented by the token, the token is received in connection with a proposed use of the data item;
   determining whether the proposed use is permitted according to the permission data;
   wherein the cipher text is retrieved in response to a determination that the proposed use is permitted according to the permission data.

4. The method of claim 3, further comprising:
   storing, in a blockchain ledger and in response retrieval of the cipher text from the multiple computer systems, a record for the token, the record containing information identifying an instance of use of the data item.

5. The method of claim 4, further comprising:
   receiving the data item from a user;
   regenerating the cipher text from the data item using the public key; and
   querying the multiple computer systems to retrieve the token associated with the cipher text.

6. The method of claim 5, wherein the each respective system of the multiple computer systems further stores data for correlating the portion of the cipher text, stored in the respective system, with the remaining portion of the cipher text that is not stored in the respective system.

7. The method of claim 6, further comprising:
   retrieving, from the blockchain ledger, records for the token; and
   presenting a use history of the data item according to the records.

8. The method of claim 3, wherein the data item includes personally identifiable information.

9. The method of claim 3, wherein one or more permitted use cases specified via an ontology or standardized nomenclature are encoded within or with the data token to represent one or more uses;
   wherein a request for access to the data token includes an intended use case specified via the ontology or standardized nomenclature to represent a plurality of intended uses; and
   wherein approval of the intended use case to access the data token is automated via matching the intended use case with the one or more permitted use cases.

10. The method of claim 9, further comprising:
    determining, by an automated system, whether the intended use case is contained within the one or more permitted use cases for the data token.

11. An apparatus, comprising:
    at least one microprocessor; and
    memory storing instructions to instruct the at least one microprocessor to communicate with:
       a user computer providing a data item containing personally identifiable information;
       a computer system of an organization as a recipient of the data item; and
       multiple computer systems that are separately administrated by different organizations;
    wherein in response to the user computer providing the data item, the instructions are configured to instruct the at least one microprocessor to:
       receive a public key of the computer system as the recipient of the data item, wherein a token representing the data item is provided to the computer system as a substitute of the data item;

encrypt the data item using the public key into a cipher text that is to be decrypted using a private key of the computer system;

divide the cipher text into multiple portions; and store, into the multiple computer systems in connection with the token, the multiple portions of the cipher text, wherein each respective system of the multiple computer systems stores no more than a portion of the cipher text, which portion is not decryptable using the private key without a remaining portion of the cipher text that is not stored in the respective system;

wherein the computer system authorized to use the data item does not store persistently the data item;

wherein in response to a request to use the data item, the computer system retrieves the cipher text from the multiple computer systems using the token and decrypts the cipher text into the data item.

12. The apparatus of claim 11, wherein in response to receiving a request containing the token, the apparatus communicates with the multiple computer systems to retrieve the cipher text.

13. The apparatus of claim 12, wherein the apparatus stores permission data identifying permitted uses of the data item represented by the token; the token is received in connection with a proposed use of the data item; and the cipher text is retrieved in response to a determination that the proposed use is permitted according to the permission data.

14. The apparatus of claim 13, wherein the apparatus further stores, in a blockchain ledger and in response retrieval of the cipher text from the multiple computer systems, a record for the token, the record containing information identifying an instance of use of the data item.

15. The apparatus of claim 14, wherein in response to a request containing the data item from a user, the apparatus regenerates the cipher text from the data item using the public key, and queries the multiple computer systems to retrieve the token associated with the cipher text.

16. The apparatus of claim 15, wherein the each respective system of the multiple computer systems further stores data for correlating the portion of the cipher text, stored in the respective system, with the remaining portion of the cipher text that is not stored in the respective system.

17. The apparatus of claim 15, wherein the apparatus retrieves, from the blockchain ledger, records for the token; and presents a use history of the data item according to the records.

18. A non-transitory computer storage medium storing instructions which, when executed on a computing apparatus, cause the computing apparatus to perform a method, the method comprising:

in response to a user computer providing data item containing personally identifiable information, obtaining a public key of a computer system of an organization as a recipient of the data item;

identifying a token representing the data item;

providing the token to the computer system as a substitute of the data item;

encrypting the data item using the public key into a cipher text that is to be decrypted using a private key of the computer system;

dividing the cipher text into multiple portions; and storing, into multiple computer systems that are separately administrated by different organizations and in connection with the token, the multiple portions of the cipher text, wherein each respective system of the multiple computer systems stores no more than a portion of the cipher text, which portion is not decryptable using the private key without a remaining portion of the cipher text that is not stored in the respective system;

wherein the computer system authorized to use the data item does not store persistently the data item;

wherein in response to a request to use the data item, the computer system retrieves the cipher text from the multiple computer systems using the token and decrypts the cipher text into the data item.

* * * * *